UNITED STATES PATENT OFFICE.

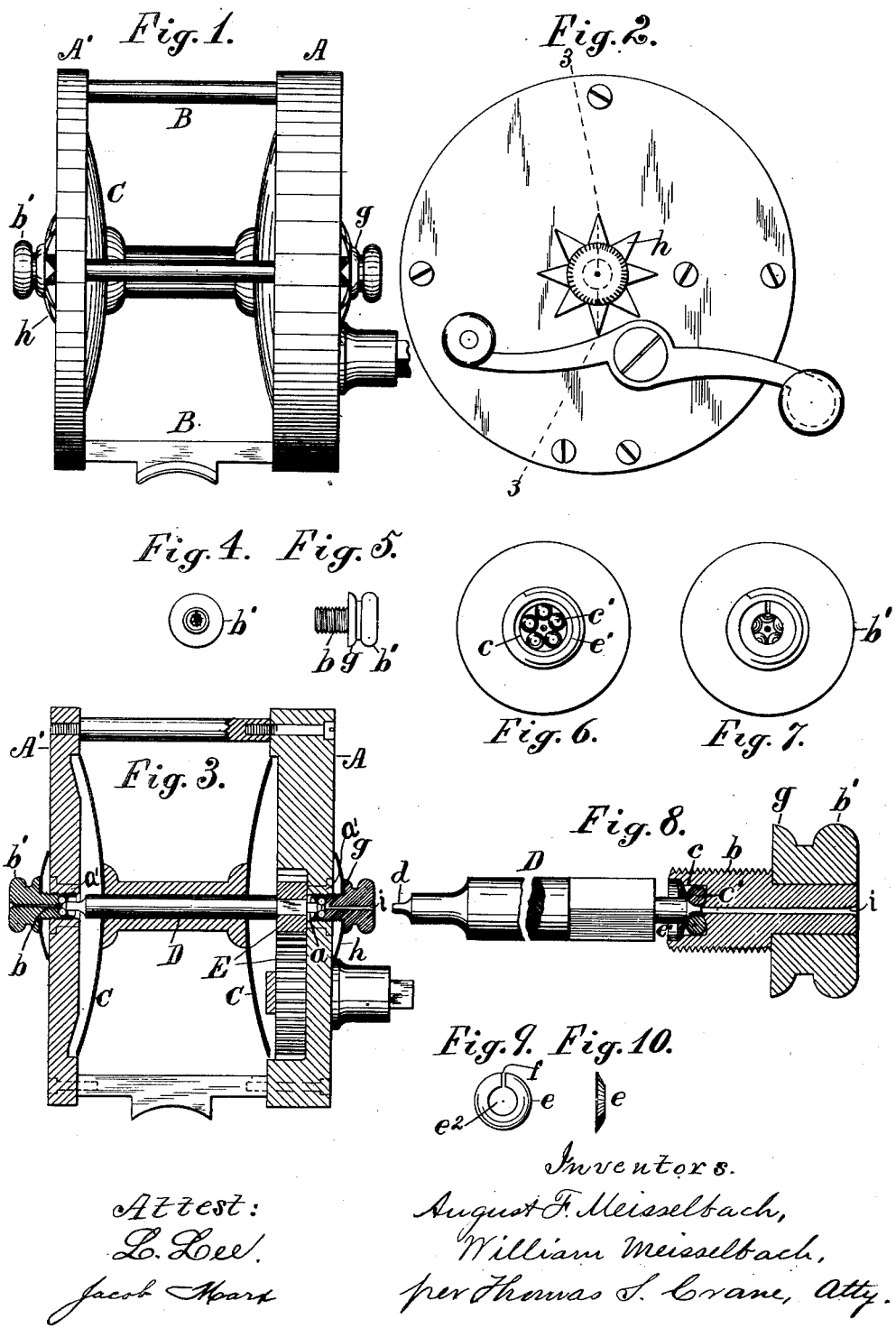

AUGUST F. MEISSELBACH AND WILLIAM MEISSELBACH, OF NEWARK, NEW JERSEY.

PIVOT BALL-BEARING FOR FISHING-REELS.

SPECIFICATION forming part of Letters Patent No. 595,110, dated December 7, 1897.

Application filed May 20, 1897. Serial No. 637,354. (No model.)

*To all whom it may concern:*

Be it known that we, AUGUST F. MEISSELBACH and WILLIAM MEISSELBACH, citizens of the United States, residing at Newark, county of Essex, State of New Jersey, have invented certain new and useful Improvements in Pivot Ball-Bearings for Fishing-Reels, &c., fully described and represented in the following specification and the accompanying drawings, forming a part of the same.

This invention relates to ball-bearings for fish-reels; and the object of the invention is to furnish a ball-bearing of the smallest possible dimensions to sustain a tapering pivot and to furnish means for adjusting the bearings at both ends of the spool-spindle, so as to clear both of the spool-flanges from the adjacent frame-plates of the reel.

The construction consists, primarily, in an annular series formed of a small number of balls, as five or six, which are held in close proximity in a ball-race, so that only a small central space is formed between the balls, and is thus especially adapted for use with pivots upon which the strain is nominal, as in fish-reels. The ball-race required for such a limited number of balls is so small in diameter that it may be fixed upon the end of a screw, and thus adjusted longitudinally with great facility into proper contact with the pivot. Such screw is termed a "socket" herein, as it contains the ball-race, the balls, and a ring fitted to hold the balls in place. The sockets are fitted to threaded apertures in the frame-plates at the opposite sides of the fish-reel and provided with collars exterior to such frame-plates to sustain the thrust of an elastic washer which is fitted between such collar and frame-plate to hold the socket by friction from accidental displacement when adjusted.

In the annexed drawings, Figure 1 is an edge view of a reel provided with the improvements. Fig. 2 is a side view of the reel; Fig. 3, a section taken on line 3 3 in Fig. 2. Fig. 4 is a view of the socket from the inner end, and Fig. 5 is a side view of the same, both views being of the natural size. Figs. 6 to 10, inclusive, show the parts drawn three times the scale of Fig. 4 to exhibit the construction clearly, Fig. 6 being a view of the socket from the inner end with the balls in the ball-race and the ring removed from its recess. Fig. 7 is a similar view with the ring in place to retain the balls in the race. Fig. 8 is a longitudinal section of the socket with an elevation of the spindle broken in the middle for want of space. Fig. 9 is a front view, and Fig. 10 an edge view, of the split ring for retaining the balls in the socket.

A A' designate the frame-plates of the reel, secured together by ties B.

C is the spool, having spindle D, with tapering pivot-points $d$ at opposits ends. Threaded apertures $a$ are formed through the frame-plates opposite the ends of the spindle, and threaded sockets $b$ are screwed in the same and provided externally with heads $b'$ to adjust the same. The sockets contain each upon the inner end the ball-race $c$, in which five balls $c'$ are shown fitted in contact with one another. A ring $e$, divided by slit $f$ at one side, is shown fitted to a recess $e'$ upon the inner end of the socket, such recess being preferably made, as shown in Fig. 8, a little larger than the ball-race $c$ to form a shoulder adjacent to the outer sides of the balls to set the ring in such a relation to the balls that it may retain the balls in the race without any possibility of the ring being accidentally crowded against the balls, and thereby cramping their movement.

The pivots formed upon the ends of the spindle are about the same diameter as a circle drawn through the centers of the balls when adjusted in the ball-race, and the hole $e^2$ in the ring $e$ is made a little larger than the pivot, so as to clear the same when supported by the balls. The ring thus covers or extends over only the outer halves of the balls.

In Fig. 8 the tapering sides of the pivot are shown hollowed or concaved, by which the base of the point is adapted to rest upon the outer sides of the balls adjacent to the ring $e$, while the point of the pivot is made nearly cylindrical, so as to extend into the central cavity between the balls, which thus support it firmly under lateral strains, while the base of the pivot, which contacts with the outer sides of the balls, resists any longitudinal thrust.

It will be observed by reference to Fig. 8 that the cylindrical or parallel portion upon the point of the pivot is much smaller in diameter than any of the balls, which is effected by using five balls only in the ball-race.

In practice it is found that a fishing-reel spindle can be thus supported upon balls only one-sixteenth of an inch in diameter, the central cavity with such dimensions being much less than one-sixteenth of an inch.

It is well known that six balls would leave a central cavity equal in diameter to one of the balls, and the use of six balls would not therefore be adapted to sustain a very small point unless the balls were excessively reduced in size, while four balls would not permit the pivot to be formed with a cylindrical end, as shown in Fig. 8, of any useful strength.

Where it is desired to form the tapering pivot with concave sides and cylindrical end, it is therefore desirable to use five balls only.

A collar $g$ is shown upon each of the sockets outside of the frame-plate, and a star-shaped washer $h$ of concave form is shown inserted between such collar and the frame-plate to press normally outward upon the collar. The frictional contact of such spring-washer with the collar and with the frame-plate prevents the socket from accidental displacement or rotation when properly adjusted in the aperture $a$ to exactly fit the pivot.

As the flanges of the spool C are fitted very close to the frame-plates of a fishing-reel (to prevent the line from crowding therein) it is preferable to have both of the sockets adjustable, so that the reel may be kept central between the plates.

When threaded externally, the socket constitutes a screw, in the point of which the entire pivot ball-bearing is contained, and such construction offers many advantages in applying a pivot ball-bearing to the reel frame-plate, as it requires simply a threaded aperture in the frame-plate to center the socket, and such a ball-bearing is adapted to operate with a pivot-point of plain conical shape fitted to the adjacent sloping surfaces of the balls, so as to penetrate the central cavity between the same.

A multiplying-reel having spur-gears E, driven by a crank F, is shown in the drawings, but the shaft for the crank is broken off in Fig. 1 for want of space upon the drawing, and the shaft is shown without the crank in Fig. 3 for the same reason. The ring $e$ is shown of dished or conical shape in order to guide the point of the pivot into the central cavity between the balls by the sense of feeling, as in the fishing-reel illustrated the point of the pivot is not visible when the ball-bearing is applied thereto. By splitting the ring with the slit $f$ in one side it is adapted to collapse in some degree and may thus be compressed slightly when inserted in the recess $e'$, so as to be held therein by its own expansive force.

Where the socket is held from displacement by the frictional contact of a spring-washer, it is obvious that any washer of compressible material, as india-rubber, or a spiral spring would be an equivalent for the star-shaped washer $h$.

An oil-hole $i$ is shown extended longitudinally through the socket, outwardly from the ball-race, to admit oil to the ball-race from the exterior of the frame, and such construction in a fishing-reel enables the operator to oil the balls without interfering with their adjustment. The threaded apertures $a$ are shown formed in metallic nuts $a'$, which are fixed in the frame-plates A A' where the latter are made of hard rubber, wood, or other light substances in the construction of a fishing-reel; but where the side plates are formed of metal the threaded aperture would constitute the nut in which the socket can be screwed.

The head $b'$ is shown formed of a separate piece from the socket and attached thereto, which construction is employed when the socket is formed of hardened steel to make a durable ball-race, and the head, as it is exposed upon the exterior of the reel, is formed of brass, German silver, or other non-rusting metal to prevent the same from rusting; but the head and socket may be formed in one piece, if desired.

Having thus set forth the nature of the invention, what is claimed herein is—

1. In a pivot ball-bearing for fish-reels, the combination, with a socket having a race with series of balls fitted therein, and an annular recess, larger than the race, forming a shoulder adjacent to the outer sides of the balls, of a compressible ring fitted to the shoulder in such recess to retain without cramping the balls in the race, substantially as herein set forth.

2. In a pivot ball-bearing for fish-reels, the combination, with a pivot having tapering sides hollowed to rest on the balls and a cylindrical point smaller than each of the balls, of a socket having a race with series of balls therein fitted to such pivot-point, the socket having an annular recess adjacent to the outer sides of the balls, with a compressible ring fitted to such recess and extended over the outer parts only of the balls, substantially as herein set forth.

3. In a pivot ball-bearing, the combination, with the frame for supporting the shaft, of a pivot-point upon the shaft, a screw-threaded socket fitted to a nut in the frame and having a ball-race with series of balls fitted to such pivot-point, a collar upon the external end of such socket, and a spring-washer between such collar and the frame to hold the socket by friction when adjusted, substantially as herein set forth.

4. In a fishing-reel, the combination, with the frame-plates A, A' having threaded apertures $a$, of the spool C having spindle D with tapering pivots at opposite ends, the threaded sockets fitted each to the aperture $a$ and having the ball-races, the series of balls, and retaining-ring upon its inner end, and provided each with the collar $g$ having the cup-shaped star-spring $h$ inserted between the same and the frame to hold the socket when adjusted, substantially as herein set forth.

In testimony whereof we have hereunto set our hands in the presence of two subscribing witnesses.

AUGUST F. MEISSELBACH.
WILLIAM MEISSELBACH.

Witnesses:
GEORGE FLOTTMANN,
THOMAS S. CRANE.